United States Patent
Auteri

[11] Patent Number: 6,143,984
[45] Date of Patent: Nov. 7, 2000

[54] ADJUSTABLE CHANNEL CONNECTOR FOR A CABLE RACEWAY SYSTEM

[75] Inventor: Robert P. Auteri, Hickory, N.C.

[73] Assignee: Tyco Electronics Corporation, Fuquay-Varina, N.C.

[21] Appl. No.: 09/285,536

[22] Filed: Apr. 2, 1999

Related U.S. Application Data

[60] Provisional application No. 60/080,418, Apr. 2, 1998.

[51] Int. Cl.[7] ................................................ H02G 3/04
[52] U.S. Cl. .................... 174/68.3; 174/72 C; 174/97; 174/101
[58] Field of Search ................... 174/68.1, 68.3, 174/72 C, 95, 96, 97, 101; 52/287.1

[56] References Cited

U.S. PATENT DOCUMENTS

| | | | |
|---|---|---|---|
| 1,189,208 | 6/1916 | Hodkinson | 174/101 |
| 1,306,142 | 6/1919 | Fitzgerald | 174/101 |
| 1,590,569 | 6/1926 | Fisk | 174/68.3 |
| 2,137,536 | 11/1938 | McConnel | 174/68.3 |
| 2,353,121 | 7/1944 | Adam et al. | 174/97 |
| 3,161,722 | 12/1964 | Wellens et al. | 174/101 |
| 4,232,845 | 11/1980 | Turner . | |
| 5,086,195 | 2/1992 | Claisse | 174/101 |
| 5,161,580 | 11/1992 | Klug | 174/68.3 |
| 5,383,318 | 1/1995 | Kelley et al. . | |
| 5,591,938 | 1/1997 | Navazo | 174/68.3 |
| 5,708,751 | 1/1998 | Mattei . | |
| 5,753,855 | 5/1998 | Nicoli et al. | 174/72 C |

FOREIGN PATENT DOCUMENTS

| | | | |
|---|---|---|---|
| 0348285 | 12/1989 | European Pat. Off. | 174/68.3 |
| 749570 | 11/1944 | Germany | 174/68.3 |

*Primary Examiner*—Kristine Kincaid
*Assistant Examiner*—Adolfo Nino
*Attorney, Agent, or Firm*—Adams, Schwartz & Evans, P.A.

[57] ABSTRACT

An adjustable raceway channel connector is adapted for interconnecting first and second cable raceway channels arranged end to end in a cable raceway system. Each of the raceway channels has a connecting end and an opposing end. The channel connector includes a bottom wall and opposing side walls. The bottom and side walls of the connector are formed to overlap respective connecting ends of the raceway channels. A longitudinally extending connector slot is formed in at least one of the side walls of the connector, and is adapted for being aligned with a channel hole formed in at least one of the raceway channels. The aligned connector slot and channel hole are adapted for receiving a fastener to join the connector and raceway channel together. The connector slot allows telescoping axial movement of the connector relative to the joined raceway channel to adjustably bridge the space between the connecting end of the first raceway channel and the connecting end of the second raceway channel.

12 Claims, 4 Drawing Sheets

ADJUSTABLE CHANNEL CONNECTOR FOR A CABLE RACEWAY SYSTEM

This patent application claims priority based on U.S. Provisional Patent Application No. 60/080,418 filed on Apr. 2, 1998. The invention relates to an adjustable channel connector for a cable raceway system, such as disclosed in the applicant's pending application U.S. Ser. No. 08/768,127, entitled FIBER OPTIC RACEWAY SYSTEM. The complete disclosure of this application is incorporated herein by reference.

TECHNICAL FIELD AND BACKGROUND OF THE INVENTION

The applicant's raceway system is a fully enclosed cable ducting system that segregates, routes and protects fiber optic cables and jumpers from their point of entry into a building to fiber termination and distribution equipment. In this system, fiber is easily traced and accessed using a convenient lay-in design, and by maintaining complete separation from twisted pair and coax cable. The raceway system is constructed of an assembly of straight channel segments, curved fittings, and channel connectors which are specifically designed to prevent fibers from exceeding the 2-inch minimum bend radius requirement, and to protect the fibers against snagging, crimping and stress.

The channel connector of the present invention is particularly adapted for joining together two straight channel segments arranged end to end in the raceway system. While the channel segments are typically preformed in lengths of 1, 2, 4 and 6 feet, a certain amount of length adjustment is often necessary in order to properly negotiate the system within a given area. Prior to the invention, if a channel segment was too long it would be cut in the field to the desired exact dimension. This process was generally time consuming and required certain tools for cutting, drilling and measuring the segments. The present invention addresses this problem by providing a connector which facilitates installation of the raceway system by allowing linear adjustment of the space between the joined channel segments. The collective length of the joined channel segments can be readily extended or retracted to custom fit the raceway system to the given area.

SUMMARY OF THE INVENTION

Therefore, it is an object of the invention to provide a channel connector for a cable raceway system which allows fast and convenient assembly of the raceway system with less required cutting, drilling, and measuring of parts in the field.

It is another object of the invention to provide a channel connector for a cable raceway system which can be easily applied as a retrofit item to existing raceway systems.

It is another object of the invention to provide a channel connector for a cable raceway system which enables safe and convenient reconfiguration of an existing raceway system.

It is another object of the invention to provide a channel connector for a cable raceway system which enables convenient length adjustment of joined channel segments without disassembly of the channel segments or connector.

These and other objects of the present invention are achieved in the preferred embodiments disclosed below by providing an adjustable raceway channel connector adapted for interconnecting first and second cable raceway channels arranged end to end in a cable raceway system. Each of the raceway channels has a connecting end and an opposing end. The channel connector includes a bottom wall and opposing side walls. The bottom and side walls of the connector are formed to overlap respective connecting of the raceway channels. A longitudinally extending connector slot is formed in at least one of the bottom and side walls of the connector, and is adapted for being aligned with a channel hole formed in at least one of the raceway channels. The aligned connector slot and channel hole are adapted for receiving a fastener therethrough to join the connector and raceway channel together. The connector slot allows telescoping axial movement of the connector relative to the joined raceway channel to adjustably bridge the space between the connecting end of the first raceway channel and the connecting end of the second raceway channel.

According to one preferred embodiment of the invention, the bottom and side walls of the connector define an enlarged opening for receiving the connecting ends of the raceway channels.

According to another preferred embodiment of the invention, first and second, outward extending flanges are integrally formed with respective side walls of the connector.

According to yet another preferred embodiment of the invention, a removable top wall is positioned on the flanges for enclosing cables extending through the connector from the first raceway channel to the second raceway channel.

According to yet another preferred embodiment of the invention, attachment means are provided for removably attaching the top wall to the flanges of the opposing side walls.

In another embodiment, an adjustable raceway channel connector is adapted for interconnecting first and second cable raceway channels arranged end to end in a cable raceway system. Each of the raceway channels has a connecting end and an opposing end. The channel connector includes a bottom wall and opposing side walls. The bottom and side walls are formed to overlap respective connecting ends of the raceway channels. First and second longitudinally extending connector slots are formed at opposite ends of the connector, and are adapted for being aligned with first and second channel holes formed in respective raceway channels. First and second fasteners extend through the aligned connector slots and channel holes to join the connector and raceway channels together. The connector slots allow telescoping axial movement of the connector relative to the joined raceway channels to adjustably bridge the space between the cable raceway channels.

In yet another embodiment, the invention is a cable raceway system for supporting, routing and protecting cables extending from one location to another. The cable raceway system includes first and second raceway channels. Each of the raceway channels has a connecting end and an opposing end, a bottom wall, and opposing side walls. An adjustable channel connector joins together respective connecting ends of the first and second raceway channels. The channel connector includes a bottom wall and opposing side walls. The bottom and side walls of the connector overlap a portion of the bottom and side walls of each of the first and second raceway channels. A longitudinally extending connector slot is formed in at least one of the bottom and side walls of the connector, and is aligned with a channel hole formed in at least one of the first and second raceway channels. The aligned connector slot and channel hole are adapted for receiving a fastener therethrough to join the connector and raceway channel together. The connector slot allows telescoping axial movement of the connector relative to the joined raceway channel to adjustably bridge the space between the connecting end of the first raceway channel and the connecting end of the second raceway channel.

According to one preferred embodiment of the invention, the bottom and side walls of the connector define an enlarged opening receiving the connecting ends of the first and second raceway channels. The connector overlaps an outside surface of the raceway channels.

According to another preferred embodiment of the invention, each of the first and second raceway channels further includes opposing, outwardly-turned top side edges.

According to yet another preferred embodiment of the invention, each of the first and second raceway channels further includes a cover having opposing, inwardly-turned side edges for mating with the outwardly-turned top side edges of the raceway channel.

According to yet another preferred embodiment of the invention, the connector includes first and second, outward extending flanges integrally formed with respective side walls of the connector.

According to yet another preferred embodiment of the invention, the connector includes a removable top wall positioned on the flanges for enclosing cable extending through the connector from the first raceway channel to the second raceway channel.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
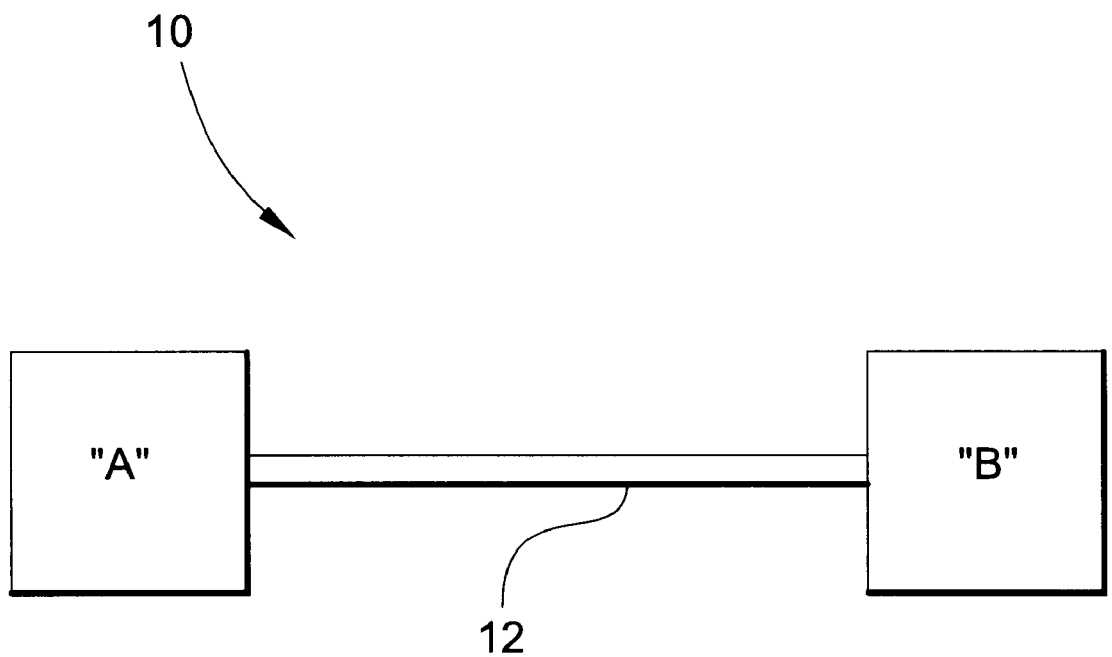
FIG. 1 is a schematic illustration of a cable raceway system for routing cable from a location "A" to a distant location "B"
Figure 2:
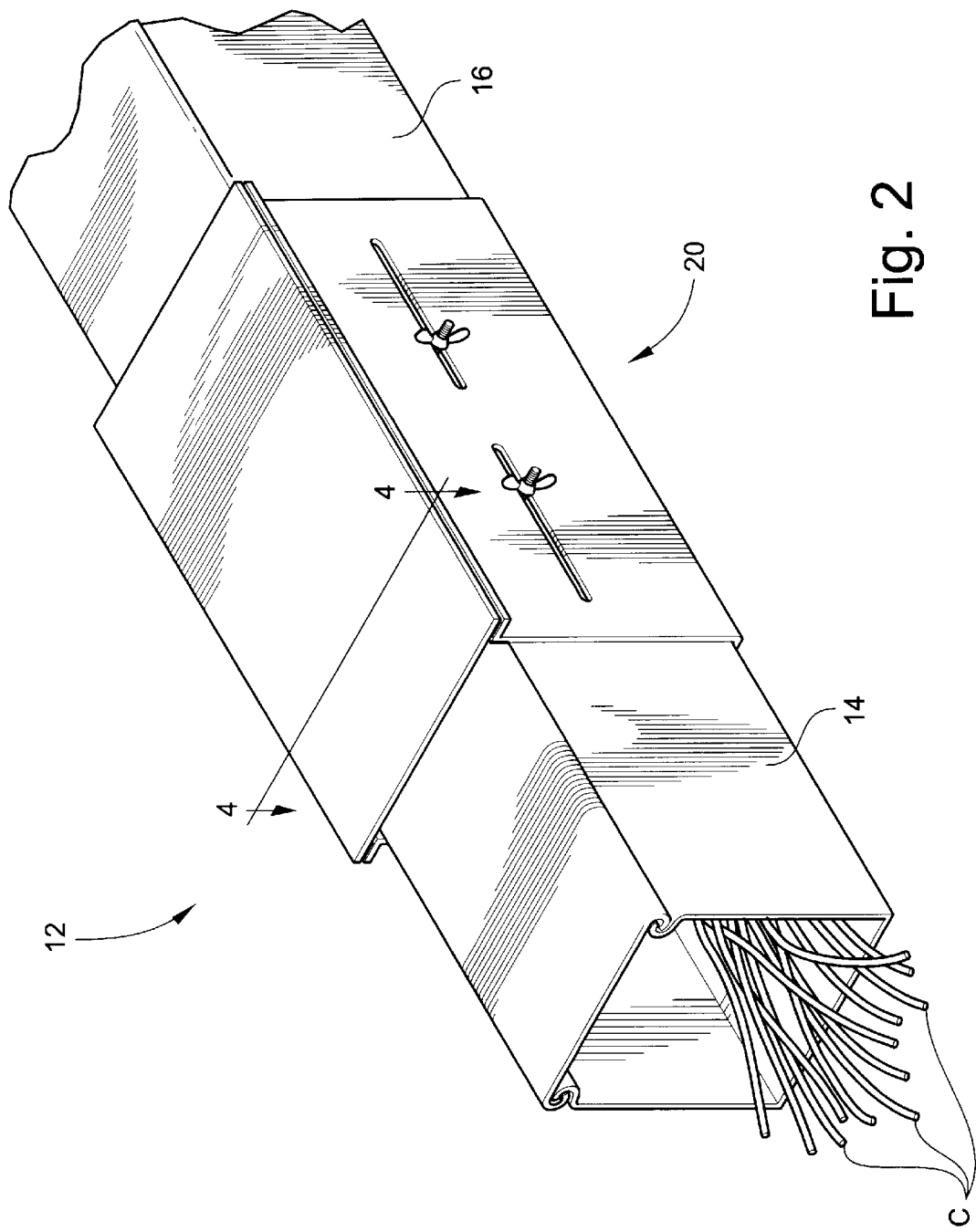
FIG. 2 is an assembled perspective view of a portion of the cable raceway system.

Referring now specifically to the drawings, a cable raceway system is illustrated in FIG. 1 and shown generally at reference numeral 10. The raceway system 10 is applicable for protecting, supporting, routing, and segregating cable, such as a fiber optic cable, running from one location "A" to a distant location "B" within a building. The raceway system 10 includes a channel assembly 12 constructed of a number of straight channel segments 14 and 16, shown in FIG. 2, and a variety of fittings, such as tees and elbows (not shown). The channel segments 14 and 16 with the fittings control the bend radius of fiber optic cable "C" passing both vertically and horizontally throughout the building. The channel segments 14 and 16 are interconnected by channel connector 20.

Figure 3:
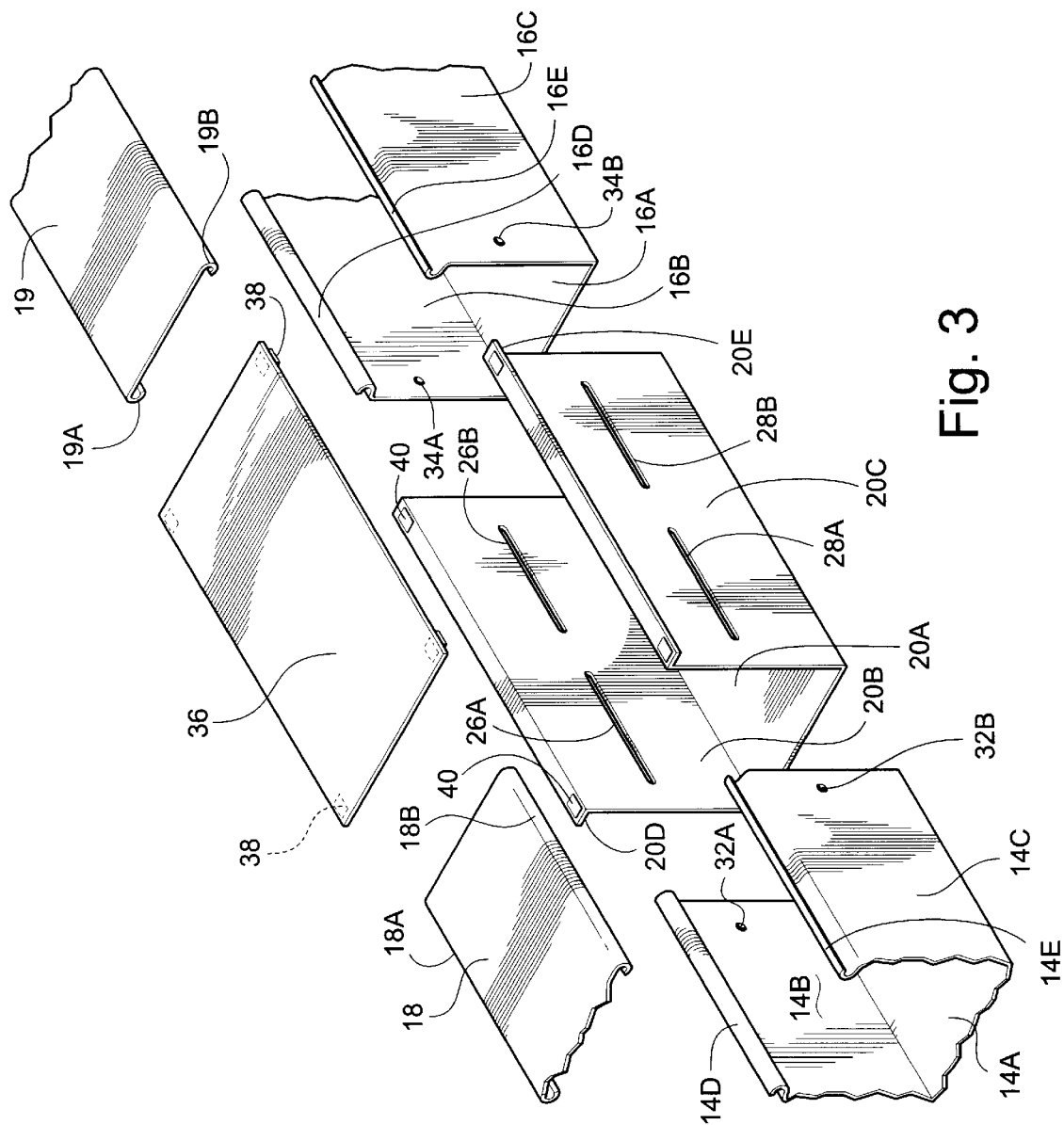
FIG. 3 is an exploded perspective view of a portion of the cable raceway system with the attachment bolts removed.

Referring to FIG. 3, the straight channel segments 14 and 16 shown are identical, and are typically formed in lengths of 1–6 feet. Each channel segment 14 and 16 includes a bottom wall 14A and 16A, opposing sides walls 14B, 14C and 16B, 16C, and outwardly-turned top side edges 14D, 14E and 16D, 16E. The top side edges 14D, 14E and 16D, 16E are integrally formed with respective side walls 14B, 14C and 16B, 16C, and are adapted for mating with complementary, inwardly-turned sides edges 18A, 18B and 19A, 19B of covers 18 and 19. The covers 18 and 19 are easily applied to the channel segments 14, 16, and are readily removed to allow convenient placement and inspection of cables "C" in the channel segments 14, 16.

The channel connector 20 has a bottom wall 20A and opposing side walls 20B and 20C which collectively form an enlarged U-shaped opening adapted for receiving and joining together connecting ends of the channel segments 14 and 16. The channel connector 20 preferably overlaps the outside of the channel segments 14 and 16, and includes outward extending top flanges 20D and 20F integrally formed with the side walls 20B and 20C. In an alternative embodiment, the channel connector may have reduced dimensions for overlapping the inside of the channel segments.

Figure 4:
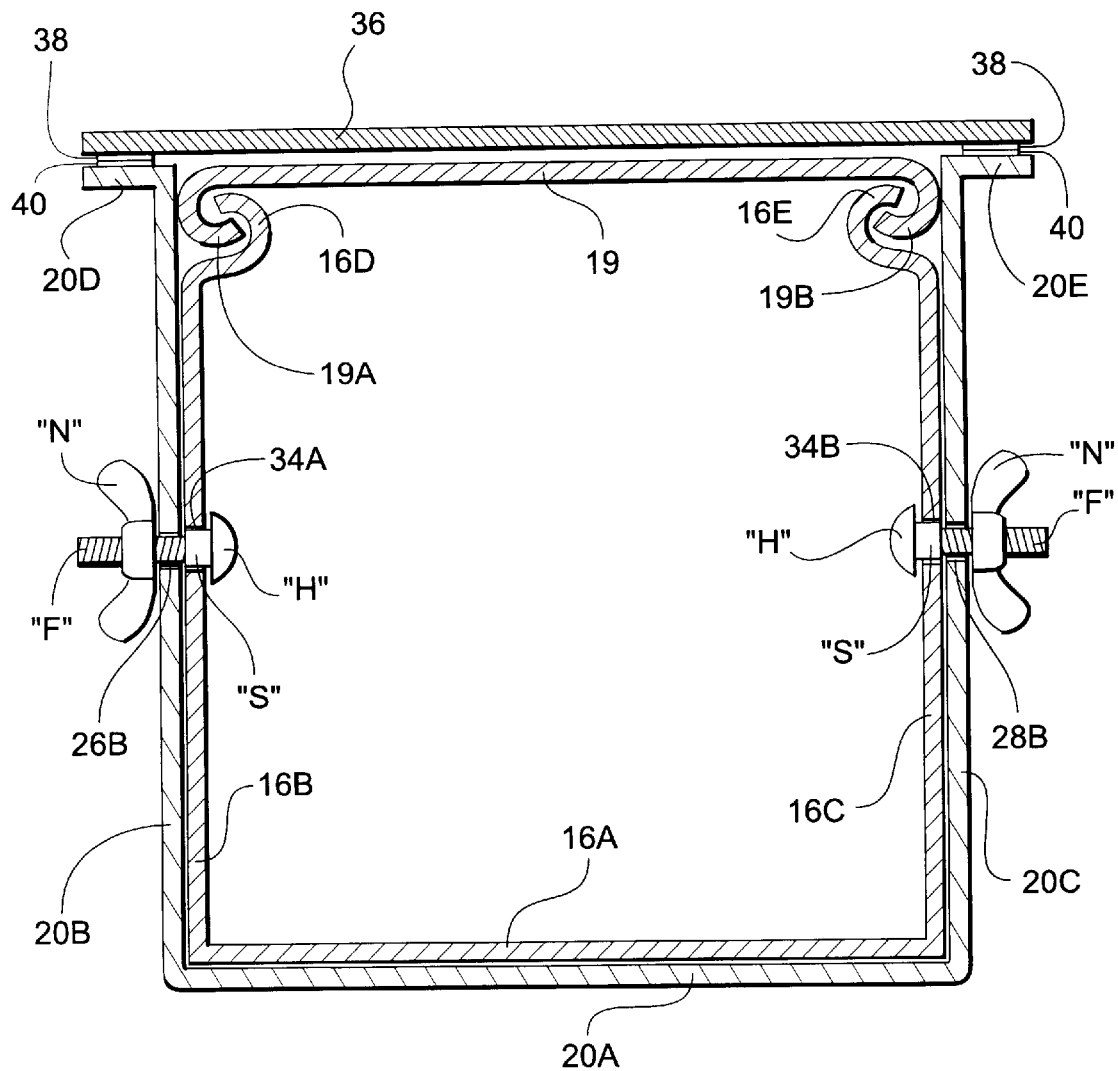
FIG. 4 is a cross-sectional view taken along line 4—4 of FIG. 2.

First and second pairs of longitudinally-extending adjustment slots 26A, 26B and 28A, 28B are formed in the side walls 20B and 20C of the channel connector 20, and are spaced from the bottom wall 20A to align with preformed holes 32A, 32B and 34A, 34B in the channel segments 14 and 16. Referring to FIG. 4, fasteners, such as standard carriage bolts "F", extend through the aligned connector slots 26A, 26B, 28A, 28B and channel holes 32A, 32B, 34A, 34B, and mate with complementary wing nuts "N" to secure the channel segments 14, 16 and the connector 20 together. The square shoulder "S" of each bolt fastener "F" enters the channel hole 32A, 32B, 34A, and 34B and prevents rotation of the fastener "F" upon application of the wing nut "N", thereby permitting assembly of the channel connector 20 without tools or special equipment. Preferably, the dimension of the square shoulder "S" is slightly larger than the diameter of the connector hole 32A, 32B, 34A, and 34B such that the shoulder "S" frictionally engages the annular perimeter edge of the hole 32A, 32B, 34A, and 34B to hold the bolt fastener "F" against rotation. The smooth rounded bolt heads "H" reside inside the channel segments 14, 16, and connector 20, thereby limiting obstruction of the cable passage. The threaded bolt shafts extend outwardly from the connector 20 to facilitate tightening and loosening adjustment of the wing nuts "N". Preferably, a total of four carriage bolts "F" and wing nuts "N" are used for attaching the connector 20 and the straight channel segments 14, 16 together.

The respectively aligned connector slots 26A, 26B, 28A, 28B and channel holes 32A, 32B, 34A, 34B, and mating carriage bolts "F" and wing nuts "N" cooperate to allow telescoping axial movement of the connector 20 relative to the joined channel segments 14 and 16 to adjustably bridge the space between connecting ends of the channel segments 14 and 16. The relative position of the channel segments 14, 16 to each other is likewise adjustable in a linear direction. Once properly positioned, the wing nuts "N" are hand-tightened to lock the channel segments 14, 16 and connector 20 together.

The connector 20 further includes a removable top wall 36 for covering the cable "C" extending between the connecting ends of the channel segments 14 and 16. The top wall 36 is removably secured to the side walls by mating patches of hook and loop fasteners 38 and 40.

According to one embodiment, the preferred length of the connector ranges from 4–23 inches. The length of the slots ranges from 1 and 4 inches. The connector and straight channel segments are preferably made of high-impact thermoplastic material with a UL rating of 94V-0. In addition, the outside surfaces of the connector and straight channel preferably have a haircell texture. The connector and straight channel segments can be made in a variety of different colors.

An adjustable channel connector for a cable raceway system is described above. Various details of the invention may be changed without departing from its scope. Furthermore, the foregoing description of the preferred embodiment of the invention and the best mode for practicing the invention are provided for the purpose of illustration only and not for the purpose of limitation.

I claim:

1. An adjustable raceway channel connector adapted for interconnecting first and second cable raceway channels arranged end to end in a cable raceway system, each of the raceway channels having a connecting end and an opposing end, said channel connector comprising:
    (a) a bottom wall and opposing side walls, the bottom and side walls being formed to overlap respective connecting ends of the raceway channels;
    (b) a longitudinally extending connector slot formed in at least one of the side walls of said connector, and adapted for being aligned with a channel hole formed in at least one of the raceway channels; and
    (c) said aligned connector slot and channel hole being adapted for receiving a fastener therethrough to join the connector and raceway channel together, such that said connector slot allows telescoping axial movement of said connector relative to the joined raceway channel to adjustably bridge the space between the connecting end of the first raceway channel and the connecting end of the second raceway channel.

2. A channel connector according to claim 1, wherein the bottom and side walls of said connector define an enlarged opening for receiving the connecting ends of the raceway channels.

3. A channel connector according to claim 1, and including first and second, outward extending, longitudinal flanges integrally formed with respective opposing side walls of said connector.

4. A channel connector according to claim 3, and including a removable top wall positioned on the flanges for enclosing cables extending through the connector from the first raceway channel to the second raceway channel.

5. A channel connector according to claim 4, and including attachment means for removably attaching the top wall to the flanges of the opposing side walls.

6. An adjustable raceway channel connector adapted for interconnecting first and second cable raceway channels arranged end to end in a cable raceway system, each of the raceway channels having a connecting end and an opposing end, said channel connector comprising:
    (a) a bottom wall and opposing side walls, the bottom and side walls being formed to overlap respective connecting ends of the raceway channels;
    (b) first and second longitudinally extending connector slots formed with said opposing side walls of said connector, and adapted for being aligned with first and second channel holes formed in respective raceway channels; and
    (c) first and second fasteners adapted for extending through the aligned connector slots and the channel holes to join the connector and raceway channels together, such that said connector slots allow telescoping axial movement of said connector relative to the joined raceway channels to adjustably bridge the space between the cable raceway channels.

7. A cable raceway system for supporting, routing and protecting cables extending from one location to another, said cable raceway system comprising:
    (a) first and second raceway channels, each of said raceway channels having a connecting end and an opposing end, a bottom wall, and opposing side walls;
    (b) an adjustable channel connector joining together respective connecting ends of said first and second raceway channels, said channel connector comprising:
        i. a bottom wall and opposing side walls, the bottom and side walls of said connector overlapping a portion of the bottom and side walls of each of said first and second raceway channels;
        ii. a longitudinally extending connector slot formed in at least one of the side walls of said connector, and aligned with a channel hole formed in at least one of the first and second raceway channels; and
        iii. said aligned connector slot and channel hole being adapted for receiving a fastener therethrough to join the connector and said at least one raceway channel together, such that said connector slot allows telescoping axial movement of said connector relative to the joined raceway channel to adjustably bridge the space between the connecting end of the first raceway channel and the connecting end of the second raceway channel.

8. A cable raceway system according to claim 7, wherein the bottom and side walls of said connector define an enlarged opening receiving the connecting ends of said first and second raceway channels, such that said connector overlaps an outside surface of said raceway channels.

9. A cable raceway system according to claim 7, wherein each of said first and second raceway channels further includes opposing, outwardly-turned top side edges.

10. A cable raceway system according to claim 9, wherein each of said first and second raceway channels further includes a cover having opposing, inwardly-turned side edges adapted for mating with the outwardly-turned top side edges of said raceway channel.

11. A cable raceway system according to claim 10, wherein said connector includes first and second, outward extending, longitudinal flanges integrally formed with respective opposing side walls of said connector.

12. A channel connector according to claim 11, wherein said connector comprises a removable top wall positioned on said flanges for enclosing a cable extending through the connector from the first raceway channel to the second raceway channel.

* * * * *